(12) United States Patent
Shimizu et al.

(10) Patent No.: US 11,322,793 B2
(45) Date of Patent: May 3, 2022

(54) BATTERY MODULE

(71) Applicant: Panasonic Intellectual Property Management Co., Ltd., Osaka (JP)

(72) Inventors: Keisuke Shimizu, Osaka (JP); Shinya Motokawa, Osaka (JP); Daisuke Kishii, Osaka (JP); Akira Takano, Osaka (JP)

(73) Assignee: PANASONIC INTEILECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 16/470,256

(22) PCT Filed: Dec. 13, 2017

(86) PCT No.: PCT/JP2017/044638
§ 371 (c)(1),
(2) Date: Jun. 17, 2019

(87) PCT Pub. No.: WO2018/123574
PCT Pub. Date: Jul. 5, 2018

(65) Prior Publication Data
US 2020/0099030 A1    Mar. 26, 2020

(30) Foreign Application Priority Data
Dec. 27, 2016    (JP) .............................. JP2016-252405

(51) Int. Cl.
*H01M 50/342* (2021.01)
*H01M 50/213* (2021.01)
(Continued)

(52) U.S. Cl.
CPC ..... *H01M 50/3425* (2021.01); *H01M 50/204* (2021.01); *H01M 50/213* (2021.01); *H01M 50/502* (2021.01)

(58) Field of Classification Search
None
See application file for complete search history.

(56) References Cited

U.S. PATENT DOCUMENTS

| 10,938,018 B2 * | 3/2021 | Motokawa ............ H01M 50/30 |
| 2013/0095356 A1 | 4/2013 | Shimizu et al. |

(Continued)

FOREIGN PATENT DOCUMENTS

| CN | 104995762 A | 10/2015 |
| CN | 106030855 A | 10/2016 |

(Continued)

OTHER PUBLICATIONS

International Search Report of PCT application No. PCT/JP2017/044638 dated Mar. 13, 2018.

(Continued)

*Primary Examiner* — Jonathan Crepeau
(74) *Attorney, Agent, or Firm* — McDermott Will & Emery LLP

(57) ABSTRACT

A battery module includes a plurality of cylindrical batteries that each include a safety valve surrounded by an annular breaking portion configured to break when internal pressure of each of the batteries exceeds a predetermined level. The battery module further includes an exhaust duct to guide gas emitted from the cylindrical battery to outside the module when safety valve is opened, and a gas direction regulator component disposed between the cylindrical batteries and the exhaust duct. The gas direction regulator component has a plurality of openings to expose the respective safety valves. Portions of the gas direction regulator component overhang areas overlapping the respective safety valves so as to cover an end of each safety valve opposite another end of each safety valve adjacent to an exit of the exhaust duct.

11 Claims, 6 Drawing Sheets

(51) Int. Cl.
*H01M 50/204* (2021.01)
*H01M 50/502* (2021.01)

(56) References Cited

U.S. PATENT DOCUMENTS

| | | | |
|---|---|---|---|
| 2015/0380700 A1 | 12/2015 | Hasegawa et al. | |
| 2017/0133645 A1 | 5/2017 | Miyata et al. | |
| 2019/0207184 A1* | 7/2019 | Koutari | H01M 50/502 |
| 2020/0313129 A1* | 10/2020 | Koutari | H01M 50/333 |

FOREIGN PATENT DOCUMENTS

| | | |
|---|---|---|
| JP | 2013-037873 | 2/2013 |
| JP | 2015-018706 | 1/2015 |
| WO | 2012/017586 | 2/2012 |
| WO | 2018/003291 | 1/2018 |

OTHER PUBLICATIONS

English Translation of Chinese Office Action dated Aug. 3, 2021 for the related Chinese Patent Application No. 201780079162.0.

* cited by examiner

BATTERY MODULE

CROSS-REFERENCE TO RELATED APPLICATIONS

This application is a U.S. national stage application of the PCT International Application No. PCT/JP2017/044638 filed on Dec. 13, 2017, which claims the benefit of foreign priority of Japanese patent application No. 2016-252405 filed on Dec. 27, 2016, the contents all of which are incorporated herein by reference.

BACKGROUND ART

It is known that a conventional battery module includes an exhaust duct to guide gas to outside the module if the gas is emitted from a battery in response to the generation of an abnormality in the battery. For example, PTL 1 discloses a battery module that includes a battery having a safety valve inside, a connection plate incorporating a gas rectifier to guide gas emitted from the battery in one direction, and an exhaust duct. According to a description in PTL 1, when gas is emitted from the battery, the gas rectifier of the connection plate bends toward the exhaust duct and acts as a rectifier plate to guide the gas in one direction.

CITATION LIST

Patent Literature

PTL 1: Unexamined Japanese Patent Publication No. 2013-37873

SUMMARY OF THE INVENTION

In some cases, a safety valve is disposed on an outer surface of a case of a battery. Battery modules incorporating such a battery are also required to overcome the important challenge of controlling a direction in which the safety valve opens such that gas emitted from the battery via the opened safety valve is smoothly discharged through an exit of the exhaust duct. A conceivable method is to form a breaking portion surrounding the safety valve into a C-shape, for example, and thereby control a direction in which the safety valve opens. Manufacturing a battery module using this method, however, necessitates arranging batteries such that the safety valves of the batteries face an identical direction.

It is an object of the present disclosure to provide a battery module that enables a safety valve of each battery to open in a direction toward an exit of an exhaust duct without necessitating an adjustment of an orientation of each battery relative to the exit of the exhaust duct.

A battery module according to the present disclosure includes a plurality of batteries that each include a safety valve surrounded by an annular breaking portion configured to break when internal pressure of each of the batteries exceeds a predetermined level. The battery module further includes an exhaust duct to guide gas emitted from any of the batteries to outside the battery module when any of the safety valves is opened, and a gas direction regulator component disposed between the batteries and the exhaust duct. The gas direction regulator component has a plurality of openings to expose the safety valves of the respective batteries. Portions of the gas direction regulator component overhang areas overlapping the respective safety valves so as to cover an end of each of the safety valves opposite another end of each of the safety valves adjacent to an exit of the exhaust duct.

The battery module according to the present disclosure enables the safety valve of each of the batteries to open in a direction toward the exit of the exhaust duct without necessitating an adjustment of an orientation of each of the batteries relative to the exit of the exhaust duct. The battery module according to the present disclosure enables the gas emitted from any of the batteries to be smoothly discharged from the exit of the exhaust duct when any of the safety valves is opened.

DESCRIPTION OF EMBODIMENT

Figure 1:
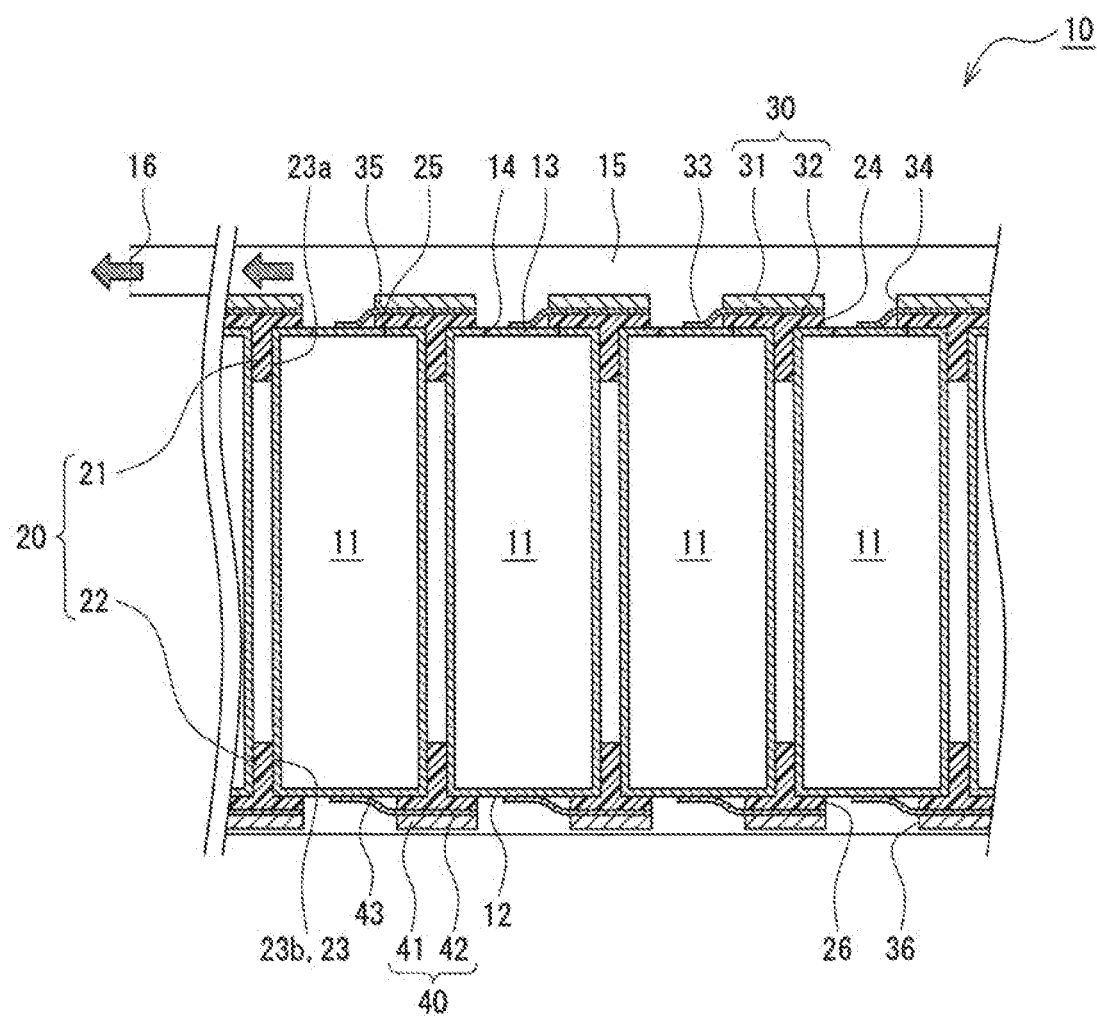
FIG. 1 is a cross-sectional view of a battery module according to an example of an exemplary embodiment.

In the battery module according to an aspect of the present disclosure, the portions of the gas direction regulator component, as described above, overhang the safety valves of the respective batteries so as to cover an end of each of the safety valves opposite another end of each of the safety valves adjacent to the exit of the exhaust duct (hereinafter referred to as an "opposite end"). In the battery module according to the aspect of the present disclosure, the portions of the gas direction regulator component covering the safety valves (hereinafter referred to as "flanges") press the opposite ends of the safety valves from outside the batteries, respectively. As a result, each of the safety valves tends to open largely toward the exit of the exhaust duct. Since the direction in which each of the safety valves opens is controlled in this manner, this configuration enables the gas emitted from any of the batteries to be smoothly discharged from the exit of the exhaust duct.

The battery module according to an aspect of the present disclosure, for example, includes at least one of a current collector plate, an insulating board, and a battery holder as the gas direction regulator component. Any of these members are generally disposed so as not to interfere with safety valves. However, the battery module according to the aspect of the present disclosure lets portions of any of these members deliberately interfere with parts of the respective safety valves and thereby regulates a direction in which each of the safety valves opens. In particular, if leads of the current collector plate each extend from a side remote from the exit of the exhaust duct over an area that overlaps each of the safety valves, the leads do not prevent the safety valves from opening. This configuration allows the gas to be discharged more smoothly.

An example of an exemplary embodiment of the present disclosure will now be described in detail. However, a battery module according to the present disclosure is not limited to the exemplary embodiment described below.

Drawings referred to in a description of the exemplary embodiment are schematically drawn, and thus dimensions and proportions of configuration elements illustrated in the drawings should be understood in view of the following description. In the description given herein, "substantially identical" means absolutely identical, as well as virtually identical, for example. Other words modified by "substantially" should be interpreted in the same manner.

In the following description, batteries incorporated in the battery module are cylindrical batteries 11, for example. The batteries may be batteries of any type other than this example. For explanatory convenience, a direction along an axis of cylindrical battery 11 is referred to as a vertical direction of the battery module, and a side adjacent to exhaust duct 15 is referred to as upper.

FIG. 1 is a cross-sectional view of battery module 10 according to an example of the exemplary embodiment. As illustrated in FIG. 1, battery module 10 includes a plurality of cylindrical batteries 11. Cylindrical battery 11 includes safety valve 13 surrounded by annular breaking portion 14 that breaks when internal pressure of the battery exceeds a predetermined level. Battery module 10 includes exhaust duct 15 to guide gas emitted from cylindrical battery 11 to outside the module when safety valve 13 of cylindrical battery 11 is opened and a gas direction regulator component disposed between cylindrical batteries 11 and exhaust duct 15 to regulate a direction in which the exhaust gas travels. As described in detail later, the gas direction regulator component has a plurality of openings to expose safety valves 13 of respective cylindrical batteries 11. Portions of the regulator component overhang areas overlapping respective safety valves 13 so as to cover an end of each safety valve 13 opposite another end of the safety valve adjacent to an exit of exhaust duct 15.

Battery module 10 includes resin-made battery holder 20 to hold the plurality of cylindrical batteries 11. Battery holder 20 has a plurality of containers 23 to house respective cylindrical batteries 11. Battery module 10 may have one or more battery blocks that each include one battery holder 20. Resin-made battery holder 20 may be replaced by a battery holder that is made of metal. In this case, an insulating board is preferably disposed between cylindrical batteries 11 and a current collector plate described later, and the insulating board may act as the gas direction regulator component described above.

Battery module 10, for example, includes a pair of current collector plates (positive-electrode current collector plate 30 and negative-electrode current collector plate 40) to connect the plurality of cylindrical batteries 11 housed in one battery holder 20 in parallel. If battery module 10 has a plurality of battery blocks that each include battery holder 20, the battery blocks are connected in series, for example. Exhaust duct 15 may be designed for the plurality of the connected battery blocks. It is, however, preferred that the exhaust duct be separated into parts for the respective blocks.

Battery module 10 includes, in the order from top, exhaust duct 15, positive-electrode current collector plate 30, the plurality of cylindrical batteries 11 housed in battery holder 20, and negative-electrode current collector plate 40. In this exemplary embodiment, each cylindrical battery 11 has safety valve 13 on one end surface in an axial direction and is disposed such that the one end surface in the axial direction faces upward. Battery holder 20 and positive-electrode current collector plate 30 have pluralities of respective openings 24, 34 to expose safety valves 13. Openings 24, 34 provide a gas route from safety valve 13 to exhaust duct 15.

Cylindrical battery 11 includes battery case 12 made of metal such as iron and a power generation element contained in the battery case. The power generation element includes, for example, an electrode assembly with a winding structure and a non-aqueous electrolyte. In one example, cylindrical battery 11 is a lithium ion secondary battery. Battery case 12 is made up of a case main body formed in a bottomed cylindrical shape for the purpose of containing a power generation element and a sealing plate sealing an opening of the case main body. In this exemplary embodiment, the sealing plate functions as a positive electrode terminal of cylindrical battery 11 and has safety valve 13. A side surface of the case main body may be covered with an insulating resin film, and if so, a lower end surface of the case main body functions as a negative electrode terminal of the cylindrical battery.

Battery holder 20 has first holder 21 to hold an upper end part of each cylindrical battery 11 and second holder 22 to hold a lower end part of each cylindrical battery 11, with these holders coupled together. Containers 23 are each formed of recess 23a of first holder 21 and recess 23b of second holder 22. The upper end part of cylindrical battery 11 is inserted into recess 23a, and the lower end part of cylindrical battery 11 is inserted into recess 23b. The plurality of containers 23 may be arranged in a staggered manner or in a matrix. As described in detail later, first holder 21 functions as the gas direction regulator component described above to control a direction in which safety valve 13 opens.

First holder 21 and second holder 22 are, for example, tray-shaped members in which pluralities of recesses 23a, 23b are formed, respectively. First holder 21 covers a periphery of an upper end surface of each cylindrical battery 11 and holds the upper end part of each cylindrical battery 11. First holder 21 has the plurality of openings 24. Second holder 22 covers a periphery of a lower end surface of each cylindrical battery 11 and holds the lower end part of each cylindrical battery 11. In a similar way to first holder 21, second holder 22 has a plurality of openings 26.

Battery holder 20 is formed from a curable resin, for example. Specific examples of the curable resin include thermosetting resins including unsaturated polyester, an epoxy resin, a melamine resin, and a phenol resin. The curable resin may contain an endothermic filler such as aluminum hydroxide or sodium hydrogen carbonate, or a thermal conductive filler such as metal oxide or metal nitride. Resin-made battery holder 20 may be replaced by a metal-made battery holder and a resin-made insulating board, for example. In this case, the insulating board disposed over cylindrical batteries 11 may be configured in the same way as first holder 21 except a function of holding the batteries.

Positive-electrode current collector plate 30 has a plurality of leads 33 connected to safety valves 13 of respective cylindrical batteries 11. In this exemplary embodiment, as described above, the sealing plate including safety valve 13 functions as a positive electrode terminal. Thus, leads 33 are connected to respective safety valves 13 so that the positive electrode terminal of each cylindrical battery 11 is electrically connected to positive-electrode current collector plate 30. Positive-electrode current collector plate 30 except leads 33 is put on top of first holder 21 and is disposed such that openings 34 vertically overlap respective openings 24 in first holder 21. As described in detail later, positive-electrode current collector plate 30 functions as the gas direction regulator component described above to control the direction in which safety valve 13 opens.

Preferably, positive-electrode current collector plate 30 includes base plate 31 and lead plate 32 incorporating the plurality of leads 33. Lead plate 32 is, for example, joined to an undersurface of base plate 31 and is put on base plate 31 with an exception of leads 33. A thickness of base plate 31, for example, ranges from 0.5 mm to 1.5 mm. A thickness of lead plate 32, for example, ranges from 0.1 mm to 0.5 mm. A thickness of safety valve 13, for example, ranges from 0.3 mm to 1.0 mm.

Negative-electrode current collector plate 40 has a plurality of leads 43 connected to the lower end surfaces of respective battery cases 12 and is electrically connected to the negative electrode terminal of each cylindrical battery 11. Negative-electrode current collector plate 40 except leads 43 is put on bottom of second holder 22 of battery holder 20 and is disposed such that openings 36 vertically overlap respective openings 26 in second holder 22. In a similar way to positive-electrode current collector plate 30, it is preferred that negative-electrode current collector plate 40 include base plate 41 and lead plate 42 incorporating the plurality of leads 43.

Figure 2:
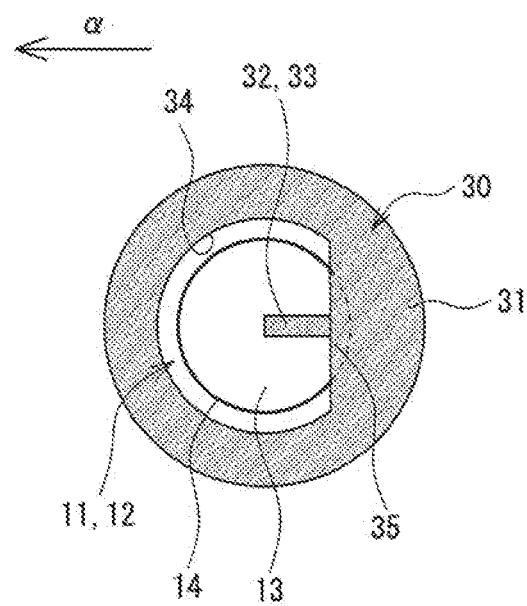
FIG. 2 is a plan view of the battery module according to the example of the exemplary embodiment, illustrating a portion corresponding to one battery.
Figure 3:
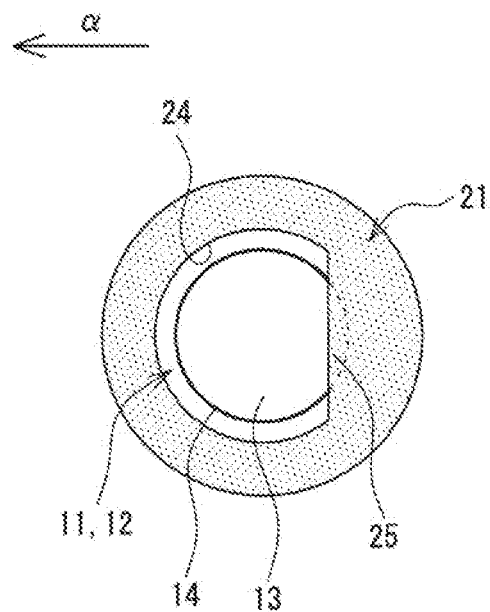
FIG. 3 illustrates a state of FIG. 2 where a positive-electrode current collector plate is removed.
Figure 4:
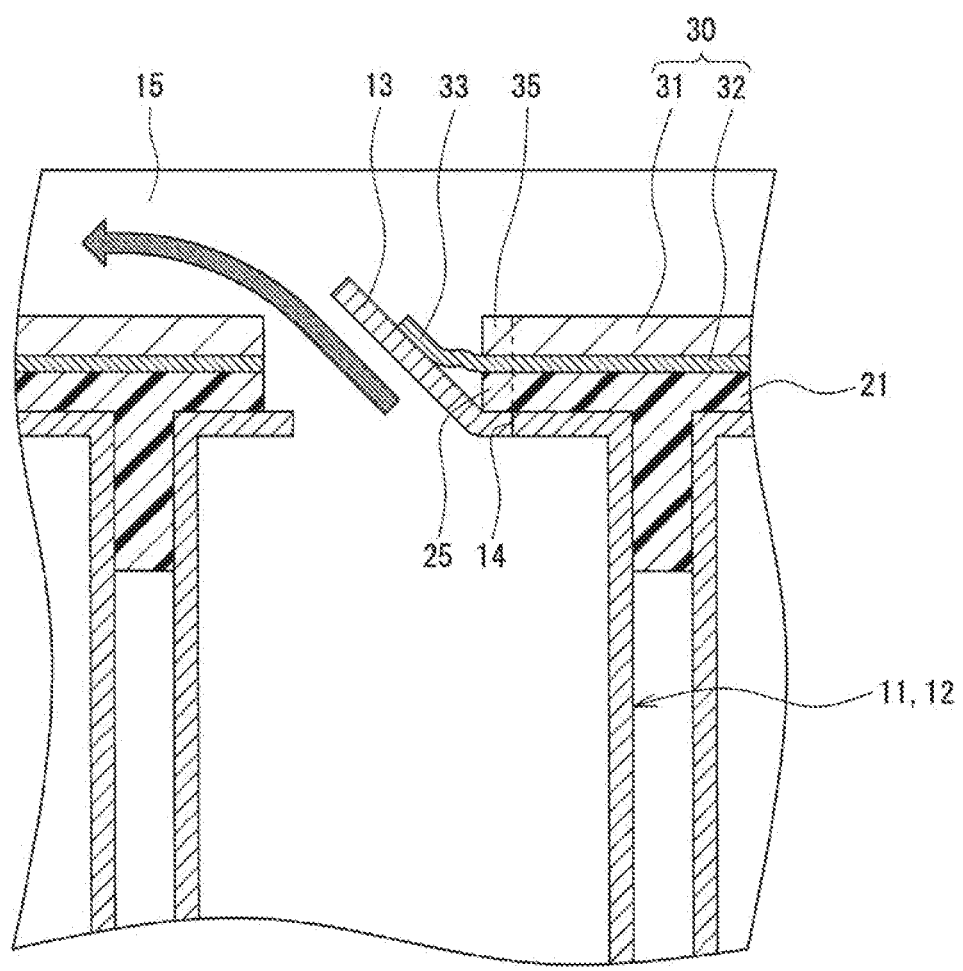
FIG. 4 is an enlarged view of a principal part in FIG. 1, illustrating a battery with a safety valve opened.

With reference to FIGS. 2 to 4 as appropriate, safety valve 13 of cylindrical battery 11, as well as first holder 21 and positive-electrode current collector plate 30 that function as the gas direction regulator component will now be described in more detail. FIG. 2 is a plan view of battery module 10, illustrating a portion corresponding to one cylindrical battery 11. FIG. 3 illustrates a state of FIG. 2 where positive-electrode current collector plate 30 is removed. In FIGS. 2 and 3, a direction in which the gas travels through exhaust duct 15 is indicated by arrow a. FIG. 4 is a drawing illustrating opened safety valve 13.

As illustrated in FIGS. 1 to 3, one safety valve 13 surrounded by annular breaking portion 14 is formed on the upper end surface (one end face in the axial direction) of cylindrical battery 11. Annular breaking portion 14 is, for example, a groove made in the sealing plate or an exterior of the case main body. The breaking portion breaks first ahead of the other part of battery case 12 in response to a rise in internal pressure following the occurrence of an abnormality in cylindrical battery 11. The groove of breaking portion 14 is generally called a marking that is formed by stamping the sealing plate or the case main body of battery case 12. A section where breaking portion 14 is formed in the sealing plate is a thin-walled part that is thinner in thickness than the other part.

Safety valve 13 may have the shape of an ellipse or a polygon in plan view. It is, however, preferred that the safety valve have the shape of a perfect circle in plan view. In the present exemplary embodiment, breaking portion 14 is an annular part having a substantially constant diameter with its center placed at a middle of the upper end surface of cylindrical battery 11, such that safety valve 13 is disposed in a central region of the upper end surface of cylindrical battery 11. If the internal pressure of cylindrical battery 11 exceeds a predetermined level and breaking portion 14 breaks, safety valve 13 opens outward from cylindrical battery 11 such that an opening is formed in the sealing plate. Thus, the gas is emitted through the opening.

Exhaust duct 15 is a space that is contiguous to safety valves 13 via the openings in first holder 21 and positive-electrode current collector plate 30, and is formed above cylindrical batteries 11. Exhaust duct 15 is, for example, formed between a wall of a module case housing battery holder 20 and positive-electrode current collector plate 30. Alternatively, exhaust duct 15 may be provided by installing a cover or a similar component to form an exhaust air space above positive-electrode current collector plate 30. In the example shown in FIG. 1, exhaust duct 15 is disposed only in an upper part of battery module 10. If safety valve 13 is formed on the lower end surface of each cylindrical battery 11, an exhaust duct is disposed below cylindrical batteries 11.

Exit 16 of exhaust duct 15 opens in a surface of battery module 10 in one direction to ensure that the exhaust gas emitted from cylindrical batteries 11 travels in an identical direction. If battery holder 20 has a substantially rectangular shape in a plan view, exit 16 of exhaust duct 15 is formed in one longitudinal end of battery holder 20, for example. Exit 16 is an opening formed in one place on the module case, the cover, or a similar component that defines exhaust duct 15.

First holder 21 and positive-electrode current collector plate 30 designed to function as the gas direction regulator component are disposed, as described above, between cylindrical batteries 11 and exhaust duct 15, and have the pluralities of respective openings 24, 34 to expose safety valves 13. A set of openings 24, 34 is formed for every one cylindrical battery 11 and vertically overlaps each other so as to expose safety valve 13. Openings 24, 34 enable respective safety valves 13 to open and constitute an exhaust gas route connecting safety valves 13 to exhaust duct 15. Each opening 24 enables lead 33 to be connected to the sealing plate.

First holder 21 and positive-electrode current collector plate 30 have respective flanges 25, 35 that each overhang an area overlapping safety valve 13 so as to cover an end of safety valve 13 opposite another end of the safety valve adjacent to exit 16 of exhaust duct 15. Flanges 25, 35, portions of first holder 21 and positive-electrode current collector plate 30 covering safety valves 13 (portions that hang over safety valves 13), each press a part of safety valve 13 from an outside of the battery in response a rise in the internal pressure of cylindrical battery 11 to prevent safety valve 13 from widely opening at flanges 25, 35. Meanwhile, portions of safety valves 13 adjacent to exit 16 are not covered with first holder 21 and positive-electrode current collector plate 30 and thus are exposed. Each flange 25 is, for example, substantially in contact with safety valve 13 to regulate the displacement of safety valve 13 caused by valve opening.

Openings 34 and flanges 35 are, for example, formed in two metal plates (base plate 31 and lead plate 32) that make up positive-electrode current collector plate 30. In this exemplary embodiment, flange 25 and flange 35 of base plate 31 are substantially identical in shape and size. Flange 25 and flange 35 of base plate 31 vertically overlap each other, with edges of the flanges being aligned. Similarly, opening 24 and opening 34 in base plate 31 are substantially identical in shape and size, and vertically overlap each other, with edges of the openings being aligned. Lead plate 32 except leads 33 may be similar in shape to base plate 31 and only leads 33 may overhang respective safety valves 13.

Lead 33 extends from a side remote from exit 16 of exhaust duct 15 over an area that vertically overlaps safety valve 13. Lead 33, for example, extends over safety valve 13 from an end of a circle centered around a center of safety valve 13, with the end of the circle being 180 degrees opposite to another end of the circle nearest to exit 16, along a direction in which the gas travels through exhaust duct 15. Lead 33 has a band shape that is long in the exhaust gas travel direction and is welded to a middle of safety valve 13.

In this case, lead 33 may act as a part of flange 35 and contribute to controlling the direction in which safety valve 13 opens.

If lead 33 extends over safety valve 13 from a side of safety valve 13 adjacent to exit 16, or if lead 33 is thin in thickness and is not able to press safety valve 13 from outside in response to a rise in the internal pressure of the battery, lead 33 does not function as the gas direction regulator component. The flanges may be formed in only one of first holder 21 and positive-electrode current collector plate 30. However, if flanges are only formed in positive-electrode current collector plate 30, it is preferred that the flanges be at least formed in base plate 31 that is thicker than lead plate 32.

In the example shown in FIGS. 2 and 3, flange 25 and flange 35 of base plate 31 have respective linear edges. Flange 25 and flange 35 of base plate 31 each have an outline made up of an arc and a straight line connecting both ends of the arc and may be substantially semicircular in shape, for example. Similarly, opening 24 and opening 34 in base plate 31 each have an outline made up of an arc and a straight line connecting both ends of the arc and may be substantially semicircular in shape, for example.

Preferably, flanges 25, 35 cover 15% to 50% of an overall length of breaking portion 14. Flanges 25, 35, for example, overhang a half region of safety valve 13 remote from exit 16 of exhaust duct 15 (hereinafter sometimes referred to as an "opposite region") so as to cover 20% to 50% of the overall length of breaking portion 14. Meanwhile, breaking portion 14 is preferably not covered with flanges 25, 35 and is exposed in a half region of safety valve 13 adjacent to exit 16 of exhaust duct 15 (hereinafter sometimes referred to as an "exit-side region"). Flanges 25, 35 thus configured regulate the displacement of safety valve 13 without hindering the opening of safety valve 13 and facilitate control of the direction in which the valve opens.

Flanges 25, 35 overhang safety valve 13 so as to cover 2.5% to 50% or preferably 10% to 25% of an area of safety valve 13, for example. Flanges 25, 35 cover 10% to 100% or preferably 20% to 50% of an area of the opposite region. Preferably, positive-electrode current collector plate 30 does not cover the exit-side region in order not to hinder the opening of safety valve 13. Lead 33 may partly exist over the exit-side region of safety valve 13. Preferably, at least 50% of the area of safety valve 13 is exposed through openings 24, 34.

As illustrated in FIG. 4, when the internal pressure of cylindrical battery 11 rises and exceeds a predetermined level, the sealing plate breaks along breaking portion 14 and safety valve 13 opens outward. This creates an opening in the sealing plate and allows the gas to be emitted from cylindrical battery 11. The emitted gas flows into exhaust duct 15 through openings 24, 34 and is discharged from exit 16 to an outside of battery module 10.

In battery module 10 having the configuration described above, flanges 25, 35 of first holder 21 and positive-electrode current collector plate 30 press the end of safety valve 13 opposite another end of the safety valve adjacent to exit 16 of exhaust duct 15 from outside cylindrical battery 11. As a result, safety valve 13 tends to open largely toward exit 16 instead of opening toward a side remote from exit 16. Since the direction in which safety valve 13 opens is controlled in this manner, this configuration enables the gas emitted from cylindrical battery 11 to be smoothly discharged from exit 16 of exhaust duct 15. Controlling the valve opening direction does not necessitate adjusting an orientation of each cylindrical battery 11 relative to exit 16 of exhaust duct 15.

In battery module 10, each lead 33 extends from a side remote from exit 16 of exhaust duct 15 over an area that overlaps safety valve 13 and hence does not prevent safety valve 13 from opening. This allows the gas to be discharged more smoothly. Flanges 25 of first holder 21 are substantially in contact with safety valves 13. This prevents safety valves 13 from opening toward a side remote from exit 16 with increased reliability. Since flanges 25, 35 have respective linear edges, safety valve 13, for example, bends at the edges of flanges 25, 35. This stabilizes a state in which the valve opens.

Figure 5:
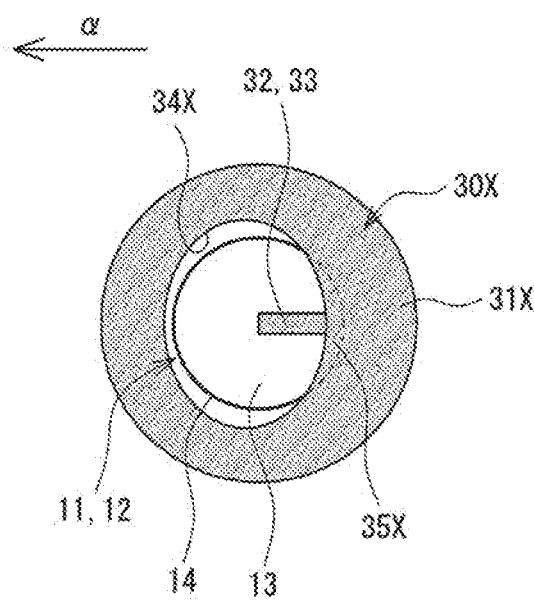
FIG. 5 is a drawing illustrating another example of the exemplary embodiment.
Figure 6:
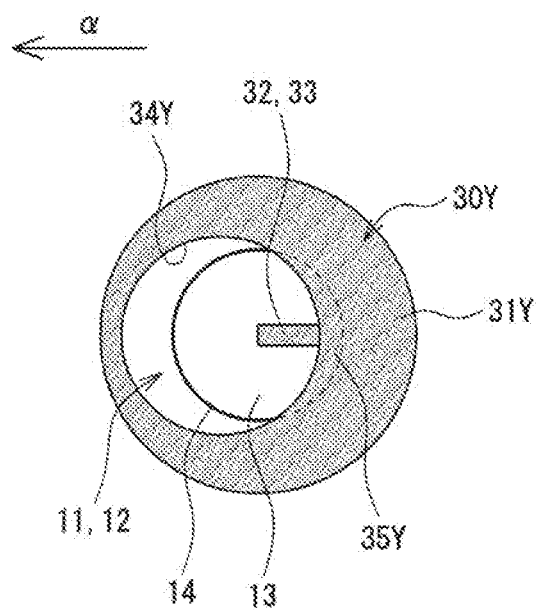
FIG. 6 is a drawing illustrating another example of the exemplary embodiment.

FIGS. 5 and 6 show positive-electrode current collector plates 30X, 30Y, variations on positive-electrode current collector plate 30, respectively. In a similar way to positive-electrode current collector plate 30, positive-electrode current collector plates 30X, 30Y have respective openings 34X, 34Y and flanges 35X, 35Y. A resin-made battery holder or an insulating board is disposed between each of positive-electrode current collector plates 30X, 30Y and cylindrical batteries 11. Preferably, any of the battery holder and the insulating board has openings and flanges similar to those in positive-electrode current collector plates 30X, 30Y, except for leads 33. Lead plates 32 of these modified plates may be the same as the lead plate of positive-electrode current collector plate 30 or may be lead plates that correspond in shape to respective base plates 31X, 31Y of positive-electrode current collector plates 30X, 30Y. If safety valves are disposed adjacent to a negative-electrode current collector plate, the configurations of positive-electrode current collector plates 30, 30X, 30Y are applied to respective negative-electrode current collector plates, for example.

In an example of FIG. 5, opening 34X has the shape of an ellipse in plan view, and flange 35X has the shape of a crescent in plan view. The ellipse of opening 34X has a major axis perpendicular to a direction indicated by arrow a in which the gas travels through exhaust duct 15. In an example of FIG. 6, flange 35Y has the shape of a crescent in plan view as with positive-electrode current collector plate 30X, but opening 34Y has the shape of a perfect circle in plan view. A center of opening 34Y is shifted from the center of safety valve 13 toward exit 16 so that the circle of opening 34Y and a circle of safety valve 13 are not concentric circles. The variations illustrated in FIGS. 5 and 6 produce effects similar to those produced by the exemplary embodiment illustrated in FIGS. 1 to 4.

The invention claimed is:

1. A battery module comprising:
 a plurality of batteries that each include a safety valve surrounded by an annular breaking portion configured to break when internal pressure of each of the plurality of the batteries exceeds a predetermined level;
 an exhaust duct to guide gas emitted from any of the plurality of the batteries to outside the battery module when any of safety valves of the plurality of batteries is opened;
 a gas direction regulator component disposed between the plurality of the batteries and the exhaust duct; and
 a current collector plate as a part of the gas direction regulator component and having a plurality of leads connected to the respective safety valves, wherein:
 the gas direction regulator component has a plurality of openings to expose the safety valves of the respective batteries, and flange portions that overhang areas overlapping the respective safety valves so as to cover an end of each of the safety valves opposite another end of each of the safety valves adjacent to an exit of the exhaust duct, the flange portions are configured such that the flange portions are in contact with the safety valves to regulate displacement of the safety valves when any of the safety valves opens, and each of the plurality of leads extends from a side remote from the exit of the exhaust duct over an area that overlaps each of the safety valves.

2. The battery module according to claim 1, comprising:
an insulating board disposed between the plurality of the batteries and the current collector plate,
wherein the gas direction regulator component comprises the current collector plate and the insulating board.

3. The battery module according to claim 1, comprising a resin-made holder acting as the gas direction regulator component and holding the plurality of the batteries.

4. The battery module according to claim 1, wherein the flange portions of the gas direction regulator component covering the respective safety valves each cover 15% to 50% of an overall length of the annular breaking portion.

5. The battery module according to claim 1, wherein the flange portions of the gas direction regulator component covering the safety valves have respective linear edges.

6. A battery module comprising:
a plurality of batteries that each include a safety valve surrounded by an annular breaking portion configured to break when internal pressure of each of the plurality of the batteries exceeds a predetermined level;
an exhaust duct to guide gas emitted from any of the plurality of the batteries to outside the battery module when any of safety valves of the plurality of batteries is opened; and
a gas direction regulator component disposed between the plurality of the batteries and the exhaust duct, wherein:
the gas direction regulator component has a plurality of openings to expose the safety valves of the respective batteries, and flange portions that overhang areas overlapping the respective safety valves so as to cover an end of each of the safety valves opposite another end of each of the safety valves adjacent to an exit of the exhaust duct,
the flange portions are configured such that the flange portions are in contact with the safety valves to regulate displacement of the safety valves when any of the safety valves opens, and
the flange portions are configured such that the safety valves bend outwardly by and at ends of the flange portions when any of the safety valves opens.

7. A battery module comprising:
a plurality of batteries, each of which includes a safety valve surrounded by an annular breaking portion configured to break when internal pressure of a corresponding one of the plurality of the batteries exceeds a predetermined level;
an exhaust duct to guide gas emitted from any of the plurality of the batteries to outside the battery module when the safety valves of the any of the plurality of batteries is opened; and
a gas direction regulator component disposed between the plurality of the batteries and the exhaust duct, wherein:
the gas direction regulator component comprises an opening to expose the safety valve of each of the plurality of batteries, and a flange portion that overhangs an area overlapping the safety valve so as to cover an end of the safety valve opposite another end of the safety valve adjacent to an exit of the exhaust duct, and
the flange portion is configured such that the safety valve bends outwardly by and at an end of the flange portion when the safety valve opens.

8. The battery module according to claim 7, comprising a resin-made holder acting as the gas direction regulator component and holding the batteries.

9. The battery module according to claim 7, wherein the flange portions of the gas direction regulator component covering the respective safety valves each cover 15% to 50% of an overall length of the annular breaking portion.

10. The battery module according to claim 7, wherein the flange portions of the gas direction regulator component covering the safety valves have respective linear edges.

11. The battery module according to claim 7, further comprising a current collector plate having a lead,
wherein the lead is disposed on the flange portion and connected to the safety valves.

* * * * *